United States Patent
Boling et al.

(10) Patent No.: US 7,215,282 B2
(45) Date of Patent: May 8, 2007

(54) TWO-WAY DISTRESS ALERT AND EMERGENCY LOCATION APPARATUS AND METHOD

(75) Inventors: Brian M. Boling, Knoxville, TN (US); Ronald D. Bishop, Trabucco Canyon, CA (US)

(73) Assignee: Procon, Inc., Knoxville, TN (US)

( * ) Notice: Subject to any disclaimer, the term of this patent is extended or adjusted under 35 U.S.C. 154(b) by 343 days.

(21) Appl. No.: 10/934,029

(22) Filed: Sep. 3, 2004

(65) Prior Publication Data

US 2006/0007038 A1    Jan. 12, 2006

Related U.S. Application Data

(60) Provisional application No. 60/551,572, filed on Mar. 9, 2004.

(51) Int. Cl.
*H04B 7/185* (2006.01)
*H04M 11/04* (2006.01)
*G08B 1/08* (2006.01)

(52) U.S. Cl. .............................. 342/357.1; 340/539.13; 455/404.2

(58) Field of Classification Search ............. 342/357.1, 342/357.07, 357.09; 340/539.13, 825.49; 455/404.2
See application file for complete search history.

(56) References Cited

U.S. PATENT DOCUMENTS

| | | | | |
|---|---|---|---|---|
| 5,519,403 A | * | 5/1996 | Bickley et al. ........ | 342/357.06 |
| 5,724,045 A | * | 3/1998 | Kawakami ............. | 342/357.07 |
| 6,275,164 B1 | * | 8/2001 | MacConnell et al. ....... | 342/457 |
| 2006/0095199 A1 | * | 5/2006 | Lagassey ................... | 701/117 |

\* cited by examiner

*Primary Examiner*—Thomas H. Tarcza
*Assistant Examiner*—F H Mull
(74) *Attorney, Agent, or Firm*—Luedeka, Neely & Graham, P.C.

(57) ABSTRACT

A portable emergency communication device includes a first receiver for receiving location determination signals from the global positioning satellite (GPS) system, and a second receiver for receiving incoming signals from a subscriber-based satellite radio system, such as the Sirius or XM satellite radio service providers. The device includes a transmitter for transmitting outgoing signals to a search and rescue satellite system, such as the Cospas-Sarsat satellite system. The incoming signals are encoded with preprogrammed queries and prompts that are displayed on a display device on the emergency communication device. The outgoing signals are encoded with location coordinates of the device and preprogrammed messages that respond to queries encoded in the incoming signals. The emergency communication device operates in a communication system wherein the search and rescue satellite system is linked by a communication network to a private search and rescue coordination center, which is linked by a communication network to the satellite radio service provider. In this manner, the invention provides a closed-loop communication system enabling two-way communication between the emergency communication device and the search and rescue coordination center.

44 Claims, 6 Drawing Sheets

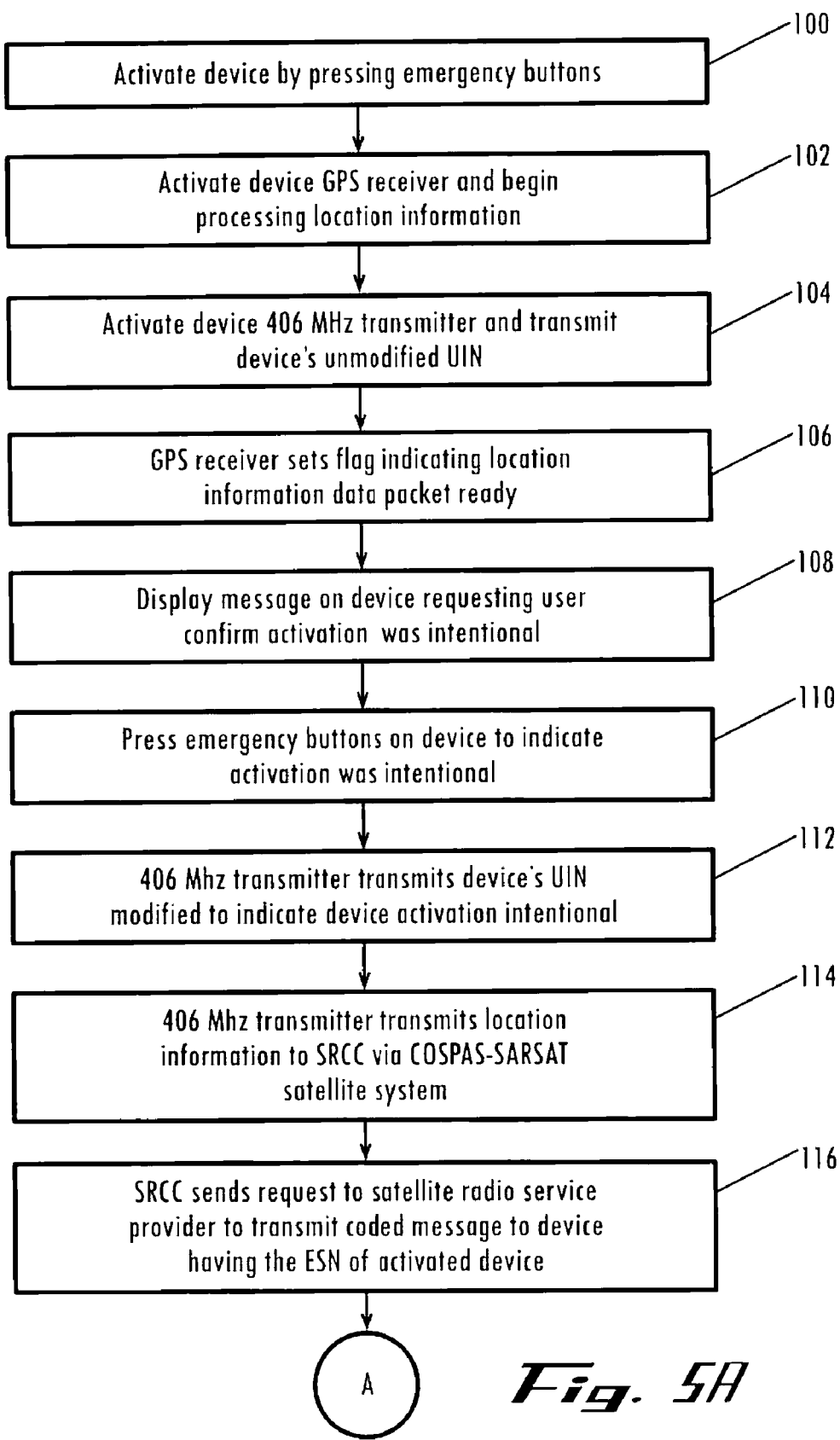

_US 7,215,282 B2_

TWO-WAY DISTRESS ALERT AND EMERGENCY LOCATION APPARATUS AND METHOD

This application claims priority to U.S. provisional patent application Ser. No. 60/551,572 filed Mar. 9, 2004, titled COMBINATION SERVICE REQUEST AND SATELLITE RADIO SYSTEM.

FIELD

This invention relates to the field of emergency beacon devices. More particularly the invention relates to a distress alert and emergency location device having two-way communication capabilities.

BACKGROUND

Those with a penchant for outdoor adventure, such as hikers, mountain climbers and whitewater enthusiasts, often find themselves in locations where standard communication services are lacking. Although cellular telephone towers seemingly are popping up everywhere one looks, in fact there are still many locations in the world were cellular telephone service is not available. In these out of the way areas, cellular phones are at times of no use if an emergency situation arises.

One option available to signal for help when in remote locations is the personal locator beacon (PLB). These devices generally comprise an RF transmitter that transmits an intermittent pulse which may be received by orbiting satellites. These PLB devices do not provide for any sort of two-way communication with search and rescue personnel. Thus, an injured mountain climber who activates a PLB in an emergency situation has no way of knowing whether the PLB signal has been received, or if help has been dispatched.

It is well known that the rate of survival of those lost or injured in the wilderness increases significantly if they know that their request for help has been received and that help is on the way.

What is needed, therefore, is an emergency signaling device that provides two-way communication between the person in an emergency situation and the emergency response personnel, even when the emergency has occurred in a remote location where no standard wireless communication services are available.

SUMMARY

The above and other needs are met by a portable emergency communication device that includes a first receiver, such as a GPS receiver, for receiving location determination signals from the global positioning satellite system, and a second receiver for receiving incoming signals from a subscriber-based satellite radio system, such as the Sirius or XM satellite radio service providers. The device also includes a display device for displaying a visual message that is based at least in part on the incoming signal from the satellite radio system. Preferably, the visual message includes response options for responding to the incoming signal. A user interface device is provided for selecting at least one of the response options. The emergency communication device includes a transmitter for transmitting outgoing signals to a search and rescue satellite system, such as the Cospas-Sarsat satellite system. In the preferred embodiment, some outgoing signals include a numeric code that indicates the location coordinates of the apparatus which were determined based on the location determination signals received by the first receiver. In other outgoing signals, the numeric code indicates a response option selected by the user in response to an incoming signal.

The emergency communication device operates in a communication system wherein the Cospas-Sarsat satellite system is linked by a communication network, such as a U.S. government owned and operated communication network, to a private search and rescue coordination center, and the private search and rescue coordination center is linked by a communication network to the satellite radio service provider. In this manner, the invention provides a closed-loop communication system enabling two-way communication between the emergency communication device and the search and rescue coordination center. In this communication system, preprogrammed coded messages from the emergency communication device to the search and rescue coordination center (referred to herein as "outgoing signals") are sent via the Cospas-Sarsat satellite system. Preprogrammed coded messages from the search and rescue coordination center to the emergency communication device (referred to herein as "incoming signals") are sent via the satellite radio system.

In another aspect, the invention provides a method for communicating information between a portable emergency communication device and three existing satellite systems. The first satellite system exists to provide location data to assist in search and rescue operations, the second satellite system exists to provide location determination signals used in determining location coordinates, and the third satellite system exists to provide subscriber-based satellite radio services. The preferred method includes the following steps:

(a) receiving location determination signals at the emergency communication device, where the location determination signals are transmitted from the second satellite system;

(b) determining location coordinate information at the emergency communication device based at least in part on the location determination signals, where the location coordinate information corresponds to the location of the emergency communication device;

(c) transmitting outgoing information from the emergency communication device to the first satellite system;

(d) communicating the outgoing information from the first satellite system to a search and rescue coordination center;

(e) communicating incoming information from the search and rescue coordination center to a satellite radio service provider, where the incoming information is generated in response to the outgoing information;

(f) transmitting the incoming information from the satellite radio service provider to the third satellite system;

(g) transmitting the incoming information from the third satellite system to the emergency communication device; and (h) receiving the incoming information at the emergency communication device.

In a preferred embodiment of the invention, the method also includes the steps of:

(i) displaying a message on a display device of the emergency communication device, where the subject matter of the displayed message is based on the incoming information and includes responses that may be selected to respond to the message;

(j) selecting a response to the displayed message using a user interface device of the emergency communication device; and (k) generating the outgoing information based at least in part on the response selected.

Also in a preferred embodiment, the method includes searching a database of local search and rescue agencies to identify which agency should respond to an emergency situation involving the emergency communication device based on the location coordinate information, and communicating a notification message from the search and rescue coordination center to the identified local search and rescue agency to inform the agency of the emergency situation.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein:

FIGS. 5A and 5B depict a flow diagram representing a method of operating a two-way distress alert and emergency location device within an emergency communication system according to a preferred embodiment of the invention.

DETAILED DESCRIPTION

Figure 1:
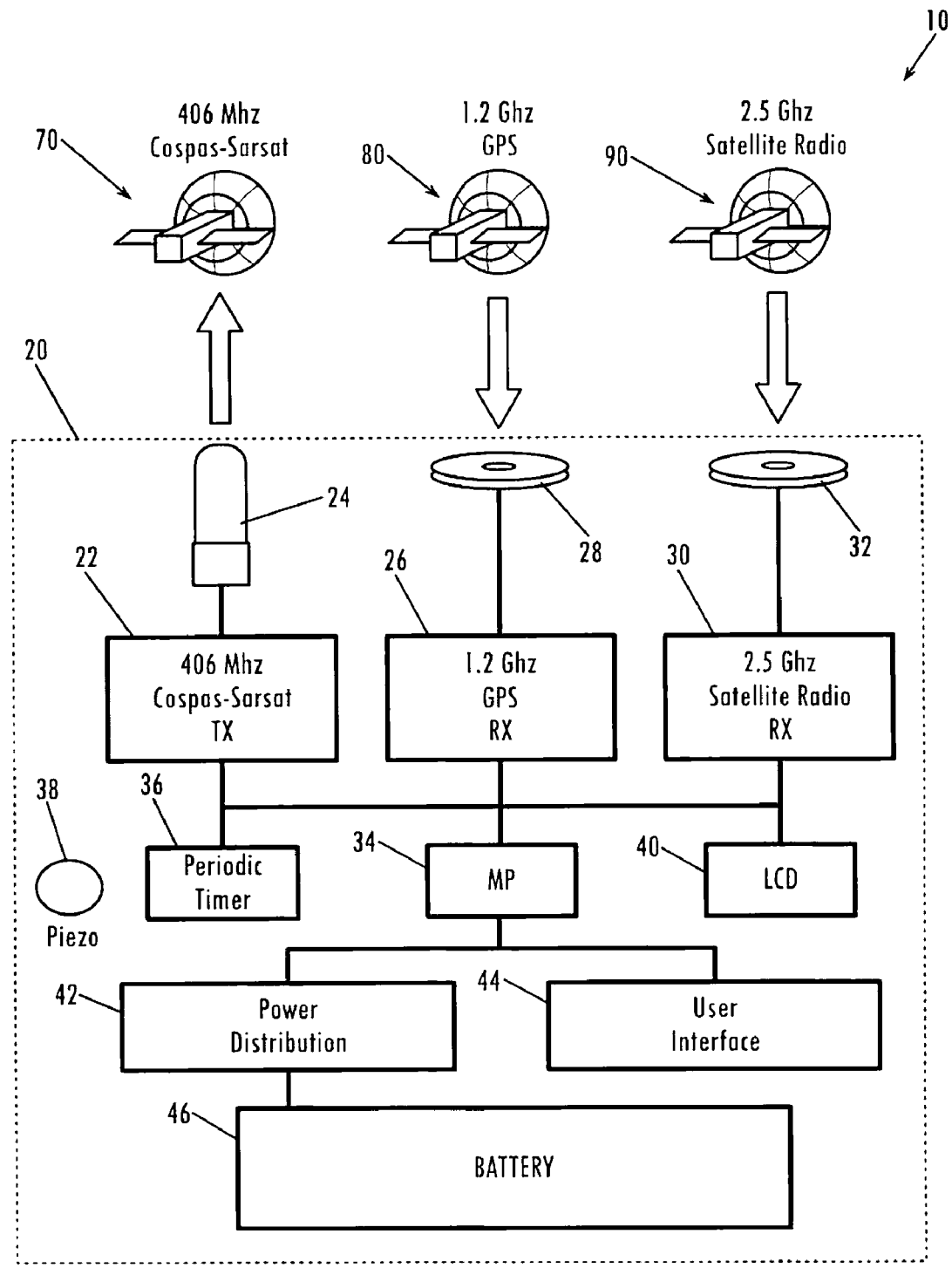
FIG. 1 depicts a functional block diagram of a two-way distress alert and emergency location device according to a preferred embodiment of the invention.

FIG. 1 depicts a preferred embodiment of an emergency communication system 10 that includes a two-way distress alert and emergency location device 20. A preferred embodiment of the physical structure of the device 20 is depicted in FIG. 2. The device 20 includes three radio frequency (RF) modules capable of operating simultaneously to provide communication and location functions in conjunction with three existing satellite systems. The RF modules include an RF transmitter 22 and two RF receivers 26 and 30.

In the preferred embodiment, the transmitter 22 generates signals at 406 Megahertz (MHz) that are transmitted via the antenna 24 to the Cospas-Sarsat satellites 70. Cospas-Sarsat is an international satellite system designed to provide distress alert and location data to assist search and rescue operations. The Cospas-Sarsat system uses spacecraft and ground facilities to detect and locate the signals of distress beacons operating on 406 MHz. The position of the distress beacon and other related information is forwarded to the appropriate Search and Rescue Point of Contact (SPOC) through the Cospas-Sarsat mission control center (MCC) network. One such MCC is the U.S. Air Force Rescue Command Center (AFRCC). The Cospas-Sarsat system provides support to organizations throughout the world with responsibility for search and rescue operations, whether at sea, in the air or on land.

Figure 3:
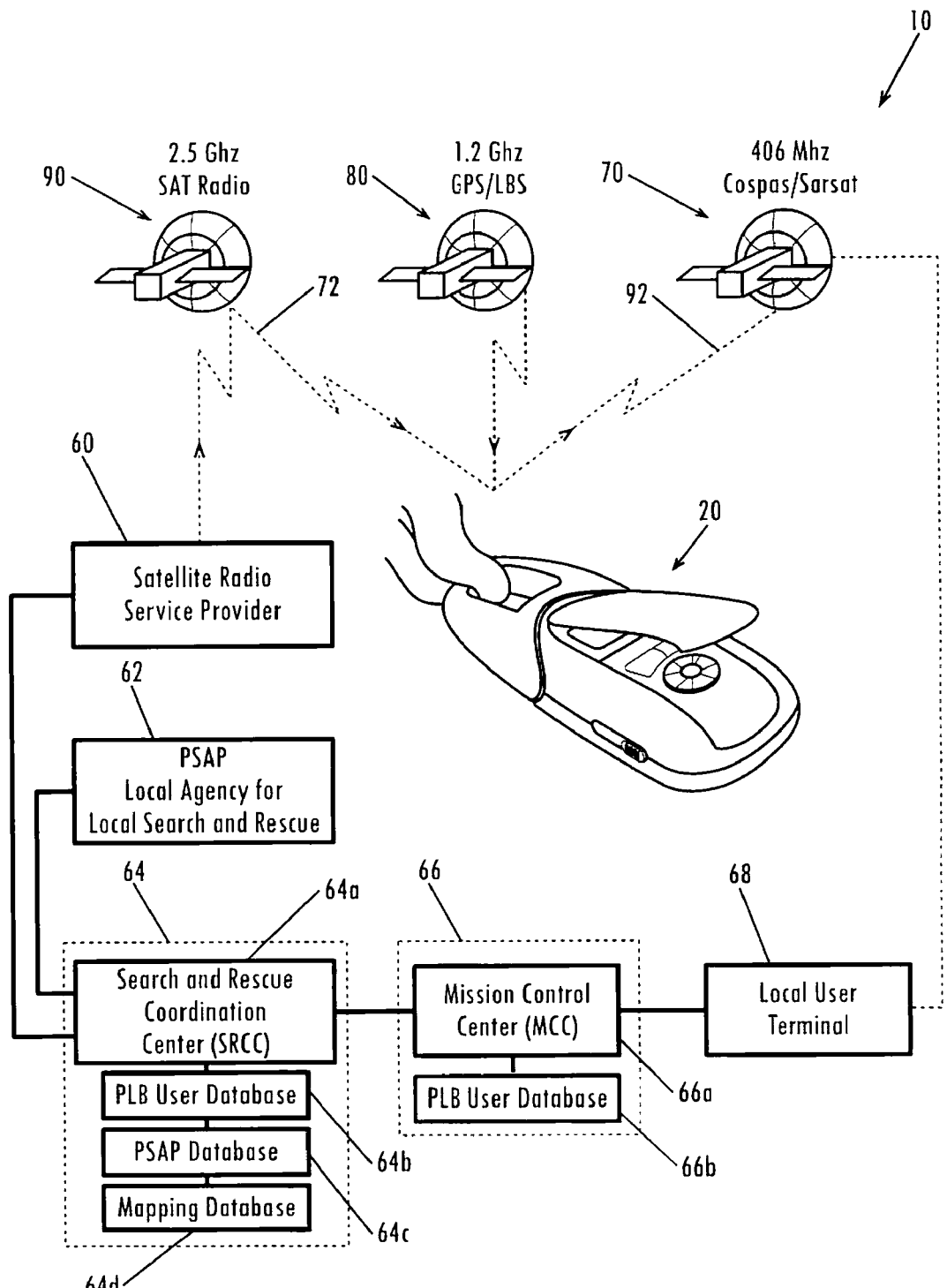
FIG. 3 depicts an emergency communication system in which a two-way distress alert and emergency location device operates according to preferred embodiments of the invention.

The Cospas-Sarsat system provides distress alert and location data to Rescue Coordination Centers (RCCs) within the coverage area of Cospas-Sarsat ground stations (Local User Terminals-LUTs) anywhere in the world. With reference to FIG. 3, the Cospas-Sarsat system comprises: distress radio beacons that transmit signals during distress situations (such as the device 20); instruments on board satellites 70 in geostationary and low-altitude Earth orbits that detect the signals transmitted by distress radio beacons; ground receiving stations, referred to as Local Users Terminals (LUTs) 68, that receive and process the satellite downlink signal to generate distress alerts; and the Mission Control Centers (MCCs) 66 that receive alerts produced by LUTs and forward them to Rescue Coordination Centers (RCCs) 64, Search and Rescue Points Of Contacts (SPOCs) or other MCCs.

With reference again to FIG. 1, the device 20 includes a global positioning satellite (GPS) receiver 26, preferably operating at about 1.2 Gigahertz (GHz). By way of the patch antenna 28, the GPS receiver 26 receives signals transmitted from a constellation of government owned and operated location based services (LBS) satellites 80. Based on signals received from at least three satellites, the GPS receiver 26 generates longitude/latitude data corresponding to the location of the device 20. In the preferred embodiment of the invention, the GPS receiver 26 processes the longitude/latitude results into a National Marine Electronics Association standard (NMEA) format to be provided to the transmitter 22 for transmission to the Cospas/Sarsat satellites 70.

The device 20 also includes a satellite radio receiver 30, preferably operating at about 2.3–2.5 GHz for receiving signals in the Digital Audio Radio Service (DARS) band. In the preferred embodiment, the satellite radio receiver 30 receives coded RF signals transmitted from satellites 90 that are privately owned and operated, such as by Sirius Satellite Radio, XM Satellite Radio, or WorldSpace. These signals are received preferably via a patch antenna 32. In alternative embodiments, the receiver 30 operates in the 1.467–1.492 GHz segment of the L-Band spectrum, which is also allocated for digital audio broadcasting in some parts of the world.

Generally, digital radio receivers are programmed to receive and decode digital audio data signals, which may contain up to 100 channels of digital audio. Satellite radio signals may also include information in addition to the encoded audio, such as information about the audio program. As described in more detail herein, the present invention makes use of this additional signal bandwidth to transmit information specifically directed to a particular alert device 20.

As shown in FIG. 1, the device 20 includes a microprocessor 34 that controls the operation of the various RF modules 22, 26 and 30 and compiles the information needed to transmit data in the Cospas-Sarsat system and receive data in the GPS and satellite radio systems. A display device 40, such as an LCD screen, is provided to display messages and options for the user of the device 20. Timing of various operations of the device 20 is controlled by a periodic timer 36.

The device 20 includes a user interface 44 that allows the user to activate the device 20 and to select responses to incoming messages and locally-generated prompts. As shown in FIG. 2, the user interface 44 of the preferred embodiment includes two activation buttons 44a, 44b and a universal control 44c. A separate power switch 44d is provided in alternative embodiments. As described in more detail hereinafter, the microprocessor 34 monitors the state of the various buttons of the user interface 44 and controls the operation of the device 20 based thereon.

Power to the device 20 is preferably supplied by one or more batteries 46. Distribution of power from the battery 46 is controlled by the power distribution module 42.

Figure 2A:
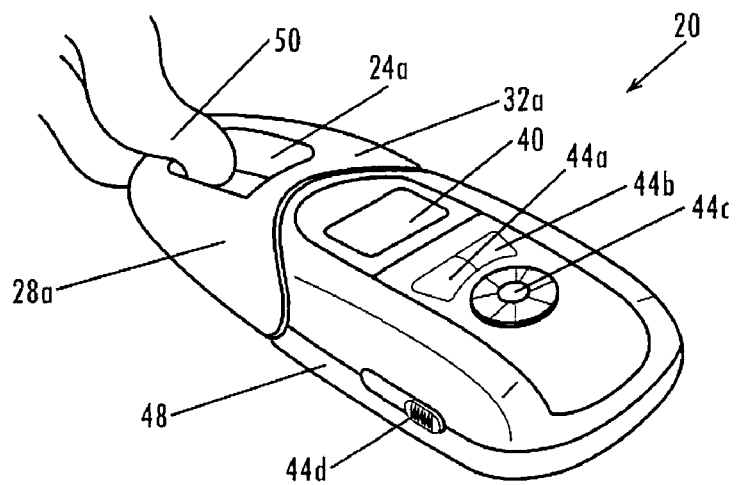
FIGS. 2A–2C depict physical structures of a two-way distress alert and emergency location device according to preferred embodiments of the invention.
Figure 2B:
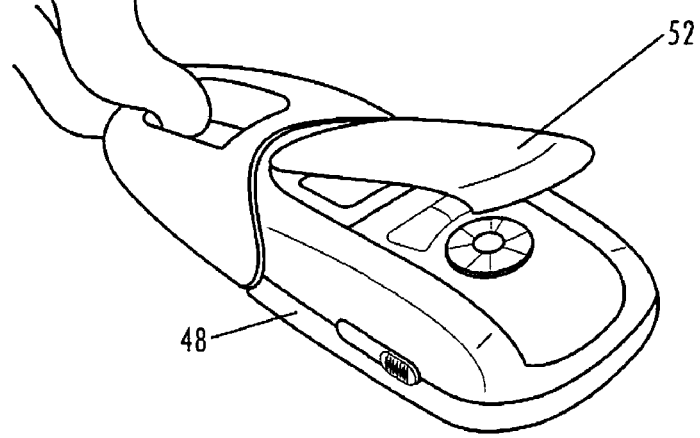
Figure 2C:
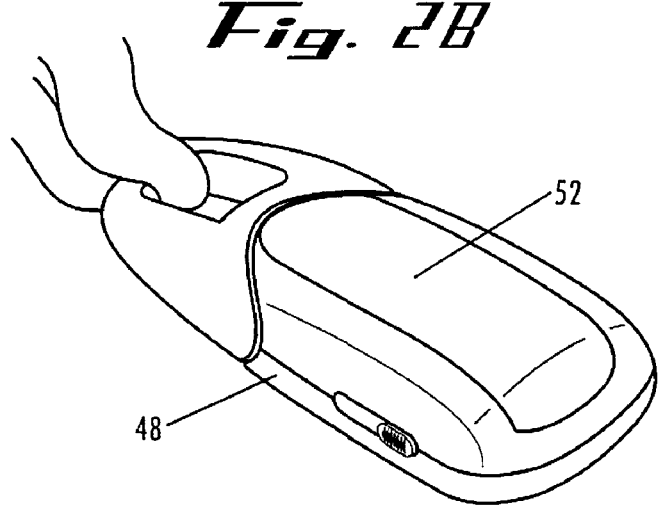

A preferred embodiment of a housing 48 for the device 20 is depicted in FIGS. 2A–2C. Preferably, the housing 48 is sized to be held comfortably in one hand while the device 20 is operated with the other hand. As shown in FIG. 2A, the display device 40, such as a two-inch LCD screen, is visible through a port in the housing 48. The two emergency activation buttons 44*a*, 44*b* and the universal control 44*c* also are accessible through ports in the housing 48. Preferably, the activation buttons 44*a*, 44*b* are adjacent each other and are centrally located as shown in FIG. 2A. In alternative embodiments, the activation buttons 44*a*, 44*b* may be located on opposing sides of the housing 48.

In the preferred embodiment, the housing 48 includes a compartment 28*a* for the GPS antenna 28, a compartment 32*a* for the satellite radio antenna 32, and a compartment 24*a* for the 406 MHz antenna 24. These compartments, which are preferably constructed of thermoplastic, are arranged as shown in FIG. 2A to form a loop through which a lanyard or carabineer 50 may be attached.

In one preferred embodiment as depicted in FIGS. 2B and 2C, the housing 48 of the device 20 includes a protective cover 52 to protect the display 40 and prevent inadvertent activation of the device 20. The cover 52 may be hinged or completely removable.

With reference to FIG. 3, device 20 operates in a communication system 10 that includes three satellite communication subsystems: the satellite radio system, the GPS system and the Cospas/Sarsat system. The satellite radio system generally comprises one or more satellites 90 and a satellite radio service provider hub 60 that typically provides broadcast studios, satellite uplink antennas, transmitters, and other communication hardware and software necessary for implementation of the satellite radio system. In the preferred embodiment, the satellite radio system is privately owned and operated, such as by XM Satellite Radio, Sirius Satellite Radio or WorldSpace. The GPS system comprises the constellation of government owned and operated LBS satellites 80. The Cospas/Sarsat system comprises the geosynchronous and low-earth orbit satellites 70, local user terminals 68, and the mission control center (MCC) 66.

The communication system 10 also includes a search and rescue coordination center (SRCC) 64, such as a call center privately owned and operated by Procon, Inc. in San Diego, Calif. The SRCC 64 comprises communication hardware and software for communicating with the MCC 66, the satellite radio service provider 60, and local search and rescue agencies 62. The SRCC 64 may also communicate with public service answering points (PSAP's), which are physical locations where emergency telephone calls are received and routed to the proper emergency service response agency. The SRCC 64 further preferably includes a database 64*b* of owners of the emergency alert devices 20, a database 64*c* of local search and rescue agencies, and a mapping database 64*d*.

Figure 5B:
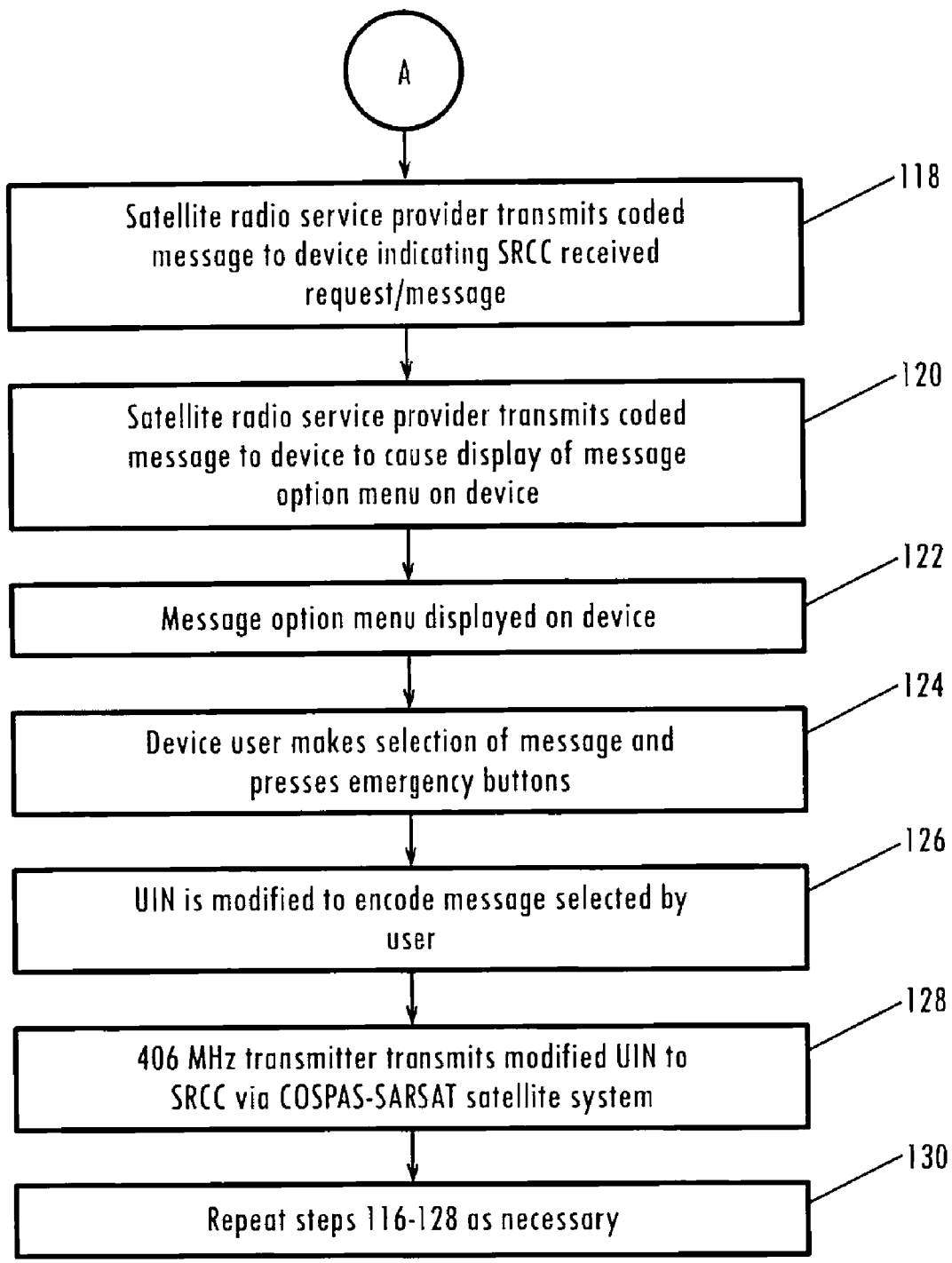

A preferred method of operation of the device 20 within the communication system 10 is depicted in FIGS. 5A and 5B. In an emergency situation, a user preferably activates the device 20 by opening the cover 52 and simultaneously pressing the two activation buttons 44*a* and 44*b* (step 100 in FIG. 5A). Although the invention is not limited to activation by pressing two buttons simultaneously, this procedure is preferred as it reduces the chances of inadvertent activation. Pressing the two buttons 44*a* and 44*b* causes the power distribution module 42 to provide power to the transmitter 22, the receivers 26 and 30, the microprocessor 34 and the periodic timer 36. At this point, the GPS receiver 26 is activated to begin searching for and receiving LBS signals from the constellation of GPS satellites 80 (step 102).

Upon power-up, the transmitter 22 warms up and begins transmitting bursts of RF signals at specified intervals, preferably at 406 MHz (step 104). In each burst, the transmitter 22 transmits the Unique Identification Number (UIN) that was assigned to the transmitter module 22 and stored in memory within the transmitter module 22 during manufacture. Preferably, in the first transmission burst, the UIN is transmitted in an unmodified string. As discussed below, the UIN string will be modified in later transmissions to communicate other information to the Cospas/Sarsat system.

Once the GPS receiver 26 has received signals from a sufficient number of GPS satellites 80, the receiver 26 preferably formats latitude/longitude location information according to the National Marine Electronics Association (NMEA) standard, and sets a flag indicating to the microprocessor 34 that a location information packet is ready (step 106).

At a preprogrammed time after power-up, the periodic timer 36 generates a locally timed signal that triggers the display of a preprogrammed message to the user. Preferably, at this time a piezo buzzer 38 sounds to alert the user, and a message is displayed on the display device 40 requesting the user confirm that activation of the device 20 was intentional (step 108). If the activation was intentional, the user should again simultaneously press the activation buttons 44*a* and 44*b* (step 110).

If at this point the user simultaneously presses the two activation buttons, the next transmission from the transmitter 22 will include a UIN string that has been modified to indicate that the activation of the device was intentional (step 112). In the preferred embodiment, the last four digits of the UIN string are set to a predetermined numerical code (such as 0101) indicating that the activation was intentional.

Preferably, in the next set of transmissions from the transmitter 22, the last four digits of the UIN string are modified according to Location Protocol Beacon Transmission standards to include the NMEA longitude/latitude data generated by the GPS receiver 26. Those transmissions occur at set intervals compliant with the Cospas/Sarsat system procedures until the entire GPS longitude/latitude data file has been received by the MCC 66 and passed along to the SRCC 64 (step 114). In the preferred embodiment, the communication path 65 between the MCC 66 and the SRCC 64 (see FIG. 4) is a virtual private network link, such as established over the Internet.

At this point, the SRCC 64 sends a message to the satellite radio service provider 60 requesting it transmit specific preprogrammed messages to the device 20 that requested assistance (step 116). The request message from the SRCC 64 to the satellite radio service provider 60 preferably identifies the particular device 20 by its Electronic Serial Number (ESN), which is unique to each device 20. In the preferred embodiment, the communication path 63 between the SRCC 64 and the satellite radio service provider 60 (see FIG. 4) is also a virtual private network link, such as established over the Internet.

Preferably, the first transmission from the satellite radio service provider 60 to the device 20 includes a data string encoded to confirm that the SRCC 64 has received a request for assistance from the particular device 20 (step 118). Upon receipt of this data string, the device 20 displays a preprogrammed message on the display 40 indicating to the user that the SRCC 64 has received the request. The data string transmitted to the device 20 may also indicate that the location coordinates of the device 20 have been successfully communicated to the SRCC 64. At this point, the piezo 38 may also sound to alert the user of the message being displayed.

The second transmission from the satellite radio service provider 60 to the device 20 preferably includes a data string encoded to cause the device 20 to display an option menu on the display 40 (step 120). In the preferred embodiment, the option menu lists different preprogrammed messages from which the user chooses to best describe the nature of the user's emergency situation (step 122). For example, one message may be "emergency—immediate medical assistance required." Another message may indicate "user lost but not injured—need assistance." Preferably, the user scrolls through a list of messages displayed on the display device 40 and selects one using the universal control 44c (step 124).

In an alternative embodiment, the functions described above performed by the first and second transmissions from the satellite radio service provider 60 to the device 20 are accomplished in a single transmission, rather than in two separate transmissions.

Based on the message selected by the user, the microprocessor 34 changes the last four digits of the UIN to correspond to the code for the selected message (step 126). The modified UIN is then transmitted by the device transmitter 22 to the MCC 66 by way of the Cospas/Sarsat satellites 70, and the MCC 66 transfers the information to the SRCC 64 (step 128).

Using the communication method described above, practically any type of preprogrammed message may be transmitted from the device 20 to the SRCC 64 via the Cospas/Sarsat system, and from the SRCC 64 to the device 20 via the satellite radio system. Based on a four-digit coded string in the UIN, up to 9999 different messages may be encoded and transmitted from the device 20 to the SRCC 64.

Figure 4:
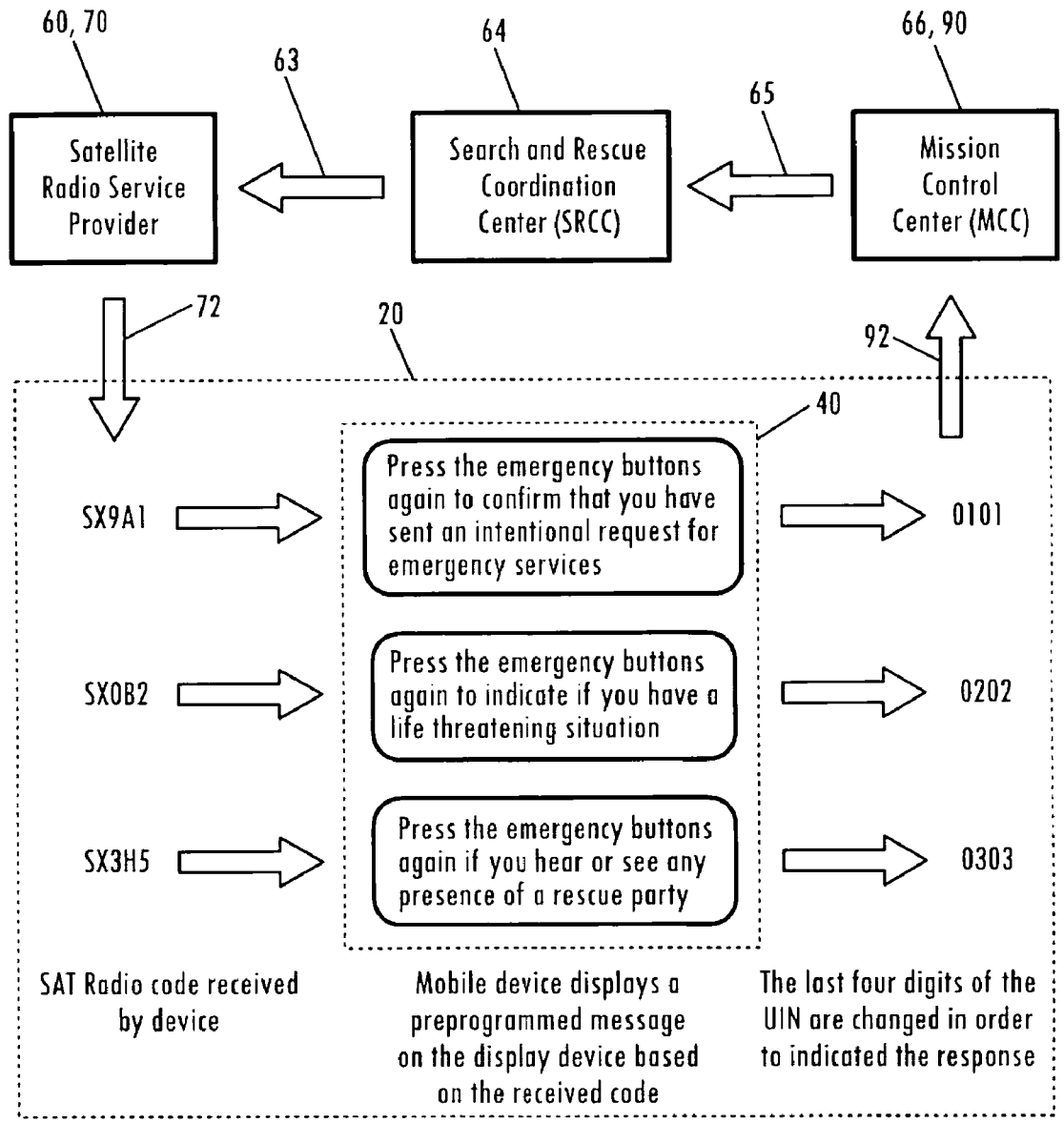
FIG. 4 depicts a functional block diagram of a communication method performed by a two-way distress alert and emergency location device according to a preferred embodiment of the invention.

The preferred embodiment of the communication "loop" of the invention is represented in FIG. 4. In this embodiment, the SRCC 64 communicates with the satellite radio service provider 60 via a dedicated data connection 63, the satellite radio service provider 60 transmits the encoded satellite radio signals to the device 20 via the satellite radio downlink 72, the device 20 transmits the encoded UIN to the MCC 66 via the Cospas/Sarsat satellite uplink 92, and the MCC 66 communicates with the SRCC 64 via the virtual private network 65.

Using this communication method, the device 20 can also receive messages from the SRCC 64 in the form of preprogrammed "YES or "NO" inquiries. For example, based on a particular code transmitted to the device 20, a message may be displayed asking the user whether the user can hear or see a search plane or search party in the vicinity. The user can select the yes/no response from the display screen 40 using 4-way directional buttons and an "ENTER" button on the universal control 44c, and transmit the unique four-digit response as part of the modified UIN by pressing both activation buttons 44a and 44b simultaneously. In this manner, the device 20 transmits the unique four-digit code that represents the response for "YES" or "NO".

It is also possible for the device 20 to transmit codes representative of the status of the device 20. For example, codes can be programmed to represent the remaining power of the device battery 46. The device 20 may transmit these codes periodically so that search and rescue personnel will know how much battery life the device 20 has remaining as the search is ongoing.

Once the SRCC 64 has acquired the UIN of the emergency device 20, the PLB user database 64b is searched to determine to whom that particular device 20 is registered. Based on the information stored in the database 64b, personnel at the SRCC 64 may call an emergency contact phone number the device user provided in the event of emergency. In this manner, the personnel at the SRCC 64 can inform the contact person of the emergency and possibly receive information from the contact person that may be helpful in the search and rescue operation.

Once the SRCC 64 has acquired the location of the emergency device 20, the PSAP database 64c is searched to determine the local search and rescue agency 62 that is nearest the coordinates of the device 20. Personnel at the SRCC 64 may then contact the local agency to inform them of the request from the emergency device 20. The mapping database 64d may be consulted to determine what roads or landmarks are near the location of the device 20, and the nature of the nearby terrain. Such information is valuable to the local agency 62 in planning and executing the search and rescue.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A portable emergency communication apparatus comprising:
   a transmitter for transmitting an outgoing signal to one or more first satellites that are components of a satellite system for providing assistance in search and rescue operations;
   a first receiver for receiving location determination signals from one or more second satellites that are components of a satellite system for providing location information;
   a second receiver for receiving an incoming signal from one or more third satellites that are components of a subscriber-based satellite radio system; and
   a housing in which the transmitter, first receiver and second receiver are disposed.

2. The apparatus of claim 1 further comprising the transmitter for transmitting the outgoing signal including a numeric code.

3. The apparatus of claim 1 further comprising the transmitter for transmitting the outgoing signal to the first satellites that are components of a Cospas-Sarsat search and rescue satellite system.

4. The apparatus of claim 1 further comprising the first receiver for receiving the location determination signals from the second satellites that are components of a global positioning satellite system.

5. The apparatus of claim 1 further comprising a display device disposed in the housing for displaying a visual message having subject matter based at least in part on the incoming signal.

6. The apparatus of claim 5 further comprising the display device for displaying the visual message including response options for responding to the incoming signal.

7. The apparatus of claim 6 further comprising a user interface device disposed in the housing for selecting at least one of the response options.

8. The apparatus of claim 7 further comprising the transmitter for transmitting the outgoing signal including a numeric code determined based at least in part on the at least one response option selected.

9. The apparatus of claim 1 further comprising:
a timing device disposed in the housing for generating a local timing signal; and
a display device disposed in the housing for displaying a visual message having subject matter determined based at least in part on the local timing signal.

10. The apparatus of claim 1 further comprising a user interface having one or more activation buttons that when pressed, cause power to be applied to the first transmitter, first receiver and second receiver.

11. The apparatus of claim 10 wherein the one or more activation buttons comprise two activation buttons that, when pressed substantially simultaneously, cause activation of the first transmitter, first receiver and second receiver.

12. The apparatus of claim 1 further comprising the transmitter for transmitting the outgoing signal including a numeric code determined based at least in part on the location determination signals received by the first receiver.

13. The apparatus of claim 1 further comprising:
a timing device disposed in the housing for generating a local timing signal;
a user interface having one or more activation buttons that when pressed, cause generation of a user input signal; and
the transmitter for transmitting the outgoing signal comprising a numeric code determined based at least in part on the relative timing of the generation of the local timing signal and the user input signal.

14. A portable emergency communication on apparatus comprising:
a first receiver for receiving location determination signals from one or more satellites that are components of a global positioning satellite system;
a second receiver for receiving an incoming signal from one or more satellites that are components of a subscriber-based satellite radio system;
a display device for displaying a visual message having subject matter based at least in part on the incoming signal, the visual message including response options for responding to the incoming signal;
a user interface device for selecting at least one of the response options;
a transmitter for transmitting at least first and second outgoing signals to one or more satellites that are components of a Cospas-Sarsat search and rescue satellite system, the first outgoing signal including a numeric code determined based at least in part on the location determination signals received by the first receiver, the second outgoing signal including a numeric code determined based at least in part on the at least one response option selected; and
a housing in which the transmitter, first receiver, second receiver, display device, and user interface are disposed.

15. The apparatus of claim 14 further comprising:
a timing device disposed in the housing for generating a local timing signal; and
the display device for displaying the visual message having subject matter determined based at least in part on the local timing signal.

16. The apparatus of claim 14 further comprising a user interface having one or more activation buttons that, when pressed, cause power to be applied to at least the first transmitter, first receiver and second receiver.

17. The apparatus of claim 16 wherein the one or more activation buttons comprise two activation buttons that, when pressed substantially simultaneously, cause power to be applied to at least the first transmitter, first receiver and second receiver.

18. A method for communicating information between a portable emergency communication device and a first satellite system, a second satellite system and a third satellite system, wherein the first satellite system is for providing assistance in search and rescue operations, the second satellite system is for providing location information, and the third satellite system is for providing subscriber-based satellite radio services, the method comprising:
(a) receiving location determination signals at the emergency communication device, the location determination signals transmitted from the second satellite system;
(b) determining location coordinate information at the emergency communication device based at least in part on the location determination signals, the location coordinate information corresponding to a location of the emergency communication device;
(c) transmitting outgoing information from the emergency communication device to the first satellite system;
(d) communicating the outgoing information from the first satellite system to a search and rescue coordination center;
(e) communicating incoming information from the search and rescue coordination center to a satellite radio service provider, the incoming information generated in response to the outgoing information;
(f) transmitting the incoming information from the satellite radio service provider to the third satellite system;
(g) transmitting the incoming information from the third satellite system to the emergency communication device; and
(h) receiving the incoming information at the emergency communication device.

19. The method of claim 18 wherein step (a) further comprises receiving the location determination signals transmitted from global positioning system satellites.

20. The method of claim 18 wherein step (c) further comprises transmitting the outgoing information including the location coordinate information.

21. The method of claim 20 further comprising:
(i) at the search and rescue coordination center, searching a database of local search and rescue agencies to identify which local search and rescue agency should respond to an emergency situation involving the emergency communication device based on the location coordinate information; and
(j) communicating a notification message from the search and rescue coordination center to the local search and rescue agency identified in step (i) to inform the local search and rescue agency of the emergency situation.

22. The method of claim 18 wherein step (c) further comprises transmitting the outgoing information including a numeric code determined based at least in part on the subject matter of the outgoing information.

23. The method of claim 22 wherein step (c) further comprises transmitting the outgoing information including a unique identification string associated with the emergency communication device, wherein the numeric code is a component of the unique identification string.

24. The method of claim 18 wherein step (c) further comprises transmitting the outgoing information including a unique identification string associated with the emergency communication device.

25. The method of claim 24 further comprising (i) searching a database of registered emergency communication devices to identify to whom the emergency communication device is registered based on the unique identification string transmitted in step (c).

26. The method of claim 24 wherein step (g) further comprises transmitting the incoming information from the third satellite system to the emergency communication device identified by the unique identification string.

27. The method of claim 18 wherein step (c) further comprises transmitting the outgoing information via a radio-frequency uplink to a Cospas-Sarsat satellite system.

28. The method of claim 18 wherein step (d) further comprises communicating the outgoing information from the first satellite system to the search and rescue coordination center via a government-operated mission control center.

29. The method of claim 28 wherein step (d) further comprises communicating the outgoing information from the first satellite system via a radio-frequency downlink to a local user terminal operated in association with the government-operated mission control center.

30. The method of claim 28 wherein step (d) further comprises communicating the outgoing information from the government-operated mission control center to the search and rescue coordination center via a virtual private network.

31. The method of claim 18 wherein step (e) further comprises communicating the incoming information from the search arid rescue coordination center to the satellite radio service provider via a dedicated data connection.

32. The method of claim 18 wherein step (f) further comprises transmitting the incoming information from the satellite radio service provider to the third satellite system via a radio-frequency uplink.

33. The method of claim 18 wherein step (g) further comprises transmitting the incoming information from the third satellite system to the emergency communication device via a radio-frequency downlink.

34. The method of claim 18 further comprising:
(i) displaying a message on a display device of the emergency communication device, the subject matter of the message based on the incoming information.

35. The method of claim 34 further comprising:
(j) displaying the message of step (i) with responses that may be selected to respond to the message:
(k) selecting a response to the message using a user interface device of the emergency communication device; and
(l) generating the outgoing information based at least in part on the response selected in step (j).

36. The method of claim 18 further comprising:
(i) displaying a message on a display device of the emergency communication device, the message inquiring whether activation of the emergency communication device was intentional;
(j) responding to the message displayed in step (i) using a user interface device of the emergency communication device; and
(k) generating the outgoing information based at least in part on the response of step (j).

37. A portable emergency communication apparatus comprising:
transmitter means for transmitting an outgoing signal to one or more first satellites that are components of a satellite system providing assistance in search and rescue operations;
first receiver means for receiving location determination signals from one or more second satellites that are components of a satellite system for providing location information;
second receiver means for receiving an incoming signal from one or more third satellites that are components of a subscriber-based satellite radio system; and
housing means for housing and protecting the transmitter means, first receiver means and second receiver means.

38. The apparatus of claim 37 further comprising display means disposed in the housing means for displaying a visual message having subject matter based on the incoming signal.

39. The apparatus of claim 38 further comprising the display means for displaying the visual message including response options for responding to the incoming signal.

40. The apparatus of claim 39 further comprising user interface means disposed in the housing means for selecting at least one of the response options.

41. The apparatus of claim 37 further comprising: timing means device disposed in the housing means, the timing means for generating a local timing signal; and display means disposed in the housing means for displaying a visual message having subject matter determined based at least in part on the local timing signal.

42. The apparatus of claim 37 further comprising:
timing means disposed in the housing means for generating a local timing signal;
user interface means disposed in the housing means for providing user control of the apparatus, the user interface means including one or more activation buttons that, when pressed, cause generation of
a user input signal; and
the transmitter means for transmitting the outgoing signal comprising a numeric code determined based at least in part on relative timing of generation of the local timing signal and the user input signal.

43. An emergency communication system for providing communication between a person experiencing an emergency situation in a remote location and search and rescue personnel, the system comprising:
a portable emergency communication device comprising:
a transmitter for transmitting outgoing signals in a radio frequency communication band allocated for distress beacon signals;
a satellite radio receiver for receiving incoming signals in a radio frequency communication band allocated for satellite radio services;
a search and rescue satellite system that provides assistance in search and rescue operations, the search and rescue satellite system for receiving the outgoing signals from the portable emergency communication device;
a satellite radio system that provides subscriber-based digital audio services, the satellite radio system for transmitting the incoming signals to the portable emergency communication device; and a search and rescue coordination center in communication with the search and rescue satellite system and the satellite radio system.

44. The emergency communication system of claim 43 further comprising:

the emergency communication device including a global positioning system receiver for receiving global positioning system signals; and a global positioning satellite system for transmitting the global positioning system signals.

* * * * *